Aug. 25, 1931.        R. D. PARKER ET AL         1,820,088
                      RECORDING APPARATUS
                      Filed Sept. 7, 1927

INVENTORS
R. D. Parker and F. H. Best
BY
ATTORNEY

Patented Aug. 25, 1931

1,820,088

UNITED STATES PATENT OFFICE

RALZEMOND D. PARKER, OF BROOKLYN, NEW YORK, AND FRED H. BEST, OF WESTFIELD, NEW JERSEY, ASSIGNORS TO AMERICAN TELEPHONE AND TELEGRAPH COMPANY, A CORPORATION OF NEW YORK

RECORDING APPARATUS

Application filed September 7, 1927. Serial No. 217,978.

This invention relates to electrical meters, and particularly to recording meters for permanently recording electrical variations.

Recording instruments may comprise a long strip of paper, tape, or other flexible material which may be impregnated with a solution of some unstable chemical compound, easily decomposed upon the passage therethrough of an electric current, and which, either due to changes within itself or by combination with another chemical material through which the electrical current may also pass, may cause a definite discoloration of the paper, tape, or other flexible material. Such instruments, as well as other instruments based on still different and well known principles, are ordinarily unsuitable for frequency measurements on, for example, telephone circuits, Even if such instruments were modified somewhat, they might still be unsuitable for frequency measurements or for the measurements of any electrical variations as are found, for example, in telephone circuits, because the time which such instruments must necessarily consume in measuring variations within a frequency range of, say, 2,000 or 3,000 cycles, would be too great.

Accordingly, it is an object of this invention to provide a recording meter or device which will be suitable for recording with considerable speed electrical variations found in telephone circuits and the like.

Another object of this invention is to transmit a long strip of paper, tape, or other flexible material from one point to another so that an elemental section thereof becomes progressively exposed and promptly acted upon by heat derived from a resistance wire through which current flows, the heat from the resistance wire causing a discoloration of the paper, tape, or other flexible material to thereby provide a record of, for example, electrical variations such as are found in telephone circuits or the like.

It is another object of this invention to employ a strip of paper, tape, or other flexible material of uniform width, so that a resistance element, through which current flows to provide heat, or any other source of heat, may be moved freely between the edges of the paper, tape, or other flexible material in accordance with electrical variations, a record being produced upon the paper, tape, or other flexible material having ordinates proportional to these electrical variations.

Figure 1:
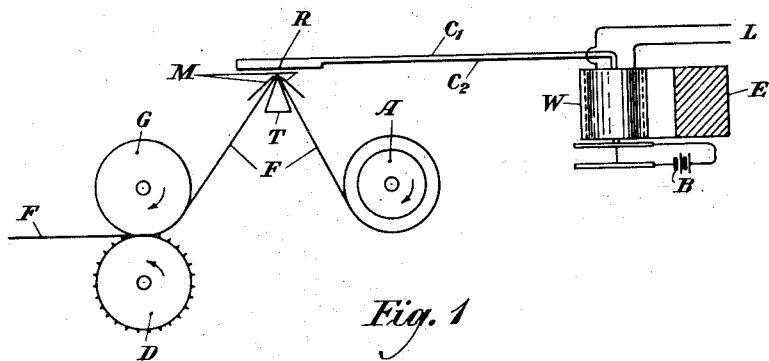
Figure 2:
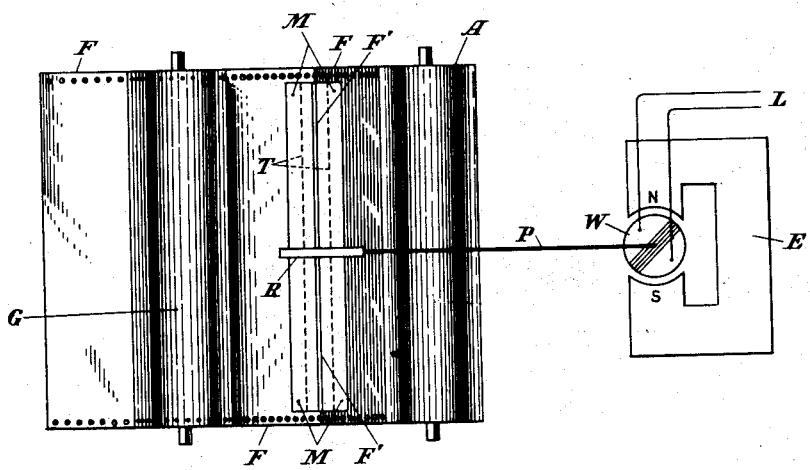

While this invention will be pointed out with particularity in the appended claims, the invention itself, both as to its further objects and features, will be better understood from the detailed description hereinafter following, when read in connection with the accompanying drawings, in which Figure 1 represents one view of apparatus embodying the principles of this invention, and Fig. 2 represents another view of such apparatus, similar reference characters being employed to designate similar parts throughout the drawings.

Referring to Figs. 1 and 2 of the drawings, there is shown a reel A upon which may be rolled a long strip of paper, tape, or other flexible material, preferably treated chemically so as to be readily affected by heat. The paper, tape, or other flexible material designated by the reference character F, unrolled from reel A, passes over a support T, which may be of any material whatsover, preferably of some highly conducting material such as aluminum, copper, or the like. Strip F then passes beneath a guide wheel or idler G and above a toothed driving wheel D, strip F having perforations near its edges which mesh with the teeth of driving wheel D.

A moving coil W is placed between the pole pieces N and S of a permanent magnet E, which maintains a strong magnetic field in a fixed relation. Electrical variations, which are to be recorded are impressed upon the leads L which are connected to the moving coil W. Accordingly, pointer P, which is fastened to the moving coil W, is deflected in proportion to these electrical variations. Pointer P, however, consists of two conductors $C_1$ and $C_2$ and a resistance wire R, all in series relationship. Conductors $C_1$ and $C_2$ may, for example, be ordinary conductors, such as copper wires. Resistance wire R may preferably be a wire which becomes heated to a comparatively high temperature when current passes therethrough. Such a wire may be made of nichrome, German silver, advance, or the like. A battery B is connected to conductors C₁ and C₂ and resistance wire R, supplying the current necessary to bring the resistance wire R to a sufficiently high temperature. It will be understood, however, that any other direct current source or any alternating current source may be employed instead of battery B, and that such a source will equally well supply the necessary heating current for resistance wire R.

Support T deflects the strip of paper, tape, or other flexible material F from the path which it would otherwise take in its travel to the driving wheel D, if support T were not present. Two shields, designated by the reference character M, are permanently fastened in position, close to support T, so that an elemental section of the paper, tape, or other flexible material, passing over support T, may become progressively exposed to the source of heat provided by the flow of current through resistance R. It is to be observed that resistance wire R is of suitable material and of the proper diameter to provide the necessary temperature when current flows therethrough from battery B. Resistance wire R is also of sufficient length so that a portion thereof will always be adjacent to the exposed elemental section F' of the paper, tape, or other flexible material. Thus, when pointer P moves through the arc of a circle corresponding to the distance between the edges of strip F, a portion of the resistance wire R will be opposite to, and almost in contact with, a portion of the elemental section F' of strip F.

The strip of paper, tape, or other flexible material F may, for example, be impregnated with a solution of nickel nitrate, nickel carbonate, or the like. Paper or other material so sensitized usually turns dark brown upon the application of heat, leaving a permanent record on the paper or flexible material. It is to be distinctly understood, however, that various other chemical solutions may equally well be employed instead of nickel nitrate or nickel carbonate, the solutions employed becoming discolored when heat of a proper and predetermined temperature is applied. It is also to be understood that if, for some reason or other, a chemically treated paper or flexible material is undesirable, the heat of a suitable source may be employed to char the paper or flexible material, thereby similarly causing a permanent record to be made thereon. If, on the other hand, the danger of charring the paper or flexible material need be minimized, then the support T may preferably be made of a highly conducting material as, for example, aluminum or copper, mentioned hereinabove, and of sufficient size so that any heat reaching the paper or flexible material may be rapidly conducted away from the paper. The minimum distance between the paper or other flexible material and the resistance wire R is determined principally by the temperature at which the paper or flexible material begins to burn.

It is to be observed that the shields M are close to the upper end of support T. These shields are so designed that only a small elemental section of the flexible material, such as F', becomes exposed and affected by the heat produced as a result of the flow of current through resistance wire R. Thus, shields M protect the flexible material from being affected by the source of heat except at an elemental section. The use of a straight edge at support T, as in the disclosed arrangement, would be a distinct advantage over an arrangement having, for example, a point source of heat, by virtue of the fact that in a system having a point source of heat the ordinates, i. e., graduations perpendicular to the line of travel of the flexible material, would necessarily be curved. By employing a comparatively long source of heat, i. e., a resistance wire of sufficient length, and a support T having a straight edge running from one side of the flexible material to the other, only a small section of the material becomes progressively exposed, so that the ordinates may be linear.

Thus, the apparatus disclosed herein provides a system in which a flexible material is moved so that an elemental section thereof becomes exposed to a source of heat, said source of heat moving from one edge of the flexible material to the other in accordance with electrical variations, the heat of the source causing a permanent impression on the flexible material. The record produced on the flexible material is continuous, rather than intermittent. The electrical variations may be recorded by such apparatus at a speed depending upon time required in having the paper undergo a permanent change. Moreover, such apparatus is particularly desirable for the measurement of the electrical characteristics of a telephone or voice frequency source in which the band width may extend over a range of, for example, 5,000 cycles.

While this invention has been pointed out in a particular embodiment merely for the purpose of illustration, it is to be distinctly understood that the general principles of this invention may be applied to other and widely varied organizations without departing from the spirit of the invention or the scope of the appended claims.

What is claimed is:

1. The method of recording continuous electrical variations, which consists in transmitting horizontally a strip of chemically treated paper of uniform width, progressively exposing only a narrow section of the paper, and applying heat of uniform intensity steadily to the exposed narrow section in order to cause a permanent impression of the continuous electrical variations upon said paper.

2. The method of recording continuous electrical variations, which consists in transmitting a strip of treated paper of uniform width so that a narrow section of the paper may become progressively exposed, consistently applying heat of uniform intensity to each exposed narrow section, and changing the point of application of the heat with respect to the edges of the paper in accordance with electrical variations, whereby a permanent record of these electrical variations will be established on said paper.

3. The method of recording continuous electrical variations, which consists in transmitting a strip of paper of uniform cross-section, steadily applying heat immediately adjacent to elemental sections of said paper in progression, and controlling the point of application of the heat with respect to the edges of the paper in accordance with said electrical variations, whereby a permanent record of said electrical variations may be established on said paper, thereby indicating the instantaneous values of these variations.

4. A recording meter comprising a strip of flexible material of uniform cross-section, a supporting member of conductive material over which said strip of flexible paper traverses and which deflects said strip, means for progressively exposing no more than a narrow section of said flexible material, and a source of heat of uniform intensity which may act upon a portion of each exposed section of said flexible member causing a permanent impression thereon.

5. A recording meter comprising a strip of flexible material of uniform cross-section, a supporting member over which said strip of flexible material traverses and which deflects said strip, means for progressively exposing only a narrow section of said flexible material, a source of heat of uniform intensity which may be made to act upon a portion of each exposed section of said flexible material, and means for moving said source of heat over each exposed section between the edges of said flexible member and at a predetermined distance from each exposed section, whereby a permanent record may be made of the variations in the characteristics of an electrical source.

6. The combination of a resistance element connected to a source of current so that said resistance element may be heated to a high, constant temperature by virtue of the flow of direct current therethrough, a strip of flexible material of uniform width unrolled from one reel and rolled upon another reel, means interposed between said reels for progressively exposing only an elemental section of said flexible material, and means for moving said resistance element between the edges of said flexible material in accordance with the electrical variations, whereby a permanent record of these electrical variations may be produced and recorded upon the flexible material.

7. A recording meter comprising a strip of flexible material chemically treated so as to be affected and discolored permanently upon the application of heat, means for progressively exposing an elemental section of said flexible material, a pointer having a wire of resistance through which current may flow continuously in order to heat that wire to a high and substantially uniform temperature, said resistance wire being adjacent to each exposed elemental section of the flexible material and applying heat to said exposed elemental section, and means for moving the pointer to which the resistance wire is connected across each elemental section between the edges thereof in accordance with electrical variations.

8. The combination of a strip of flexible material of uniform width which is treated so as to be easily and permanently discolored upon the application of heat, a source of heat of substantially constant temperature, said source being rotated throughout the arc of a circle between the edges of said flexible material and at a predetermined distance from said flexible material, and means for exposing no greater than an elemental section of said flexible material to said source of heat.

9. The combination of a strip of flexible material of uniform width treated so as to be easily and permanently discolored upon the application of heat, a source of heat the temperature of which is substantially constant, an electromagnetic device which may cause the movement of said source of heat throughout the arc of a circle between the edges of said flexible material, and means for progressively exposing no greater than an elemental section of said flexible material to said source of heat, said source of heat being adjacent and continually exposed to each elemental section of the flexible material.

10. A recording meter comprising a strip of flexible material, means for moving the flexible material from one point to another, a support interposed between these points for deflecting the flexible material from its otherwise normal path, a pointer having two conductors and a wire of resistance connected serially, a source of current connected to this series circuit in order that the resistance wire may be heated to a high and substantially constant temperature, means to permit the heat of the resistance wire to become progressively applied to a narrow section of the flexible material, and means for deflecting the pointer having the heated resistance wire from one edge of the flexible material to the other in accordance with electrical variations.

11. Recording apparatus including an elongated wire of resistance through which current may steadily flow to produce heat of uniform intensity, a strip of material which may be readily acted upon by heat, said wire being always uniformly spaced at a definite distance from said strip of material and exposed only to a small section of said strip of material, and means for moving said wire between the edges of said strip of material in accordance with continuous variations to be recorded.

12. Recording apparatus including an elongated wire of resistance through which direct current may flow to produce heat of substantially constant temperature throughout its length, and means for moving said wire through a predetermined arc in accordance with continuous variations to be recorded.

13. Recording apparatus including a source of heat, a strip of material which may be readily acted upon by said heat to cause permanent impressions thereon, and means including a metallic shield for limiting the application of said heat to no more than a predetermined section of said strip of material.

14. Recording apparatus for recording continuously varying currents including a strip of material which may be readily affected by heat and a movable wire of resistance through which current may continuously flow to produce heat uniformly throughout its length, said wire being always spaced uniformly a substantially constant distance from the strip of material during the recording process.

15. Recording apparatus including a strip of material which may be affected by heat, a wire of resistance through which current flows continuously and uniformly, and a plate having a narrow aperture interposed between the wire of material and the strip of material for exposing no more than an elemental section of said material to said wire.

16. The combination of an instrument having a pointer which may be rotated about a fixed axis and an elongated wire of resistance supported by said pointer uniformly parallel thereto.

17. A recording system including a strip of material which may be readily affected by heat, an instrument having a pointer movable about a fixed axis, said pointer being movable in a plane parallel with a small portion of said strip of material, and an elongated wire of resistance through which current may flow, said wire being supported by the pointer of said instrument and uniformly parallel with said small portion of the strip of material.

18. An instrument having a pointer formed of an elongated wire of resistance rotatable about a fixed axis and a source of current to heat said wire uniformly throughout its length to a high temperature.

19. In apparatus for recording signaling variations, the combination of a movable strip of material upon which the signaling variations may be continuously recorded, and a wire of resistance heated uniformly throughout its length to a high temperature and movable angularly through an arc a chord of which is perpendicular to the line of motion of said strip of material.

20. Apparatus for recording signaling variations in rectangular coordinates comprising a movable strip of material, a wire of resistance movable angularly through an arc the chord of which is perpendicular to the line of motion of said strip of material, and a device having a narrow slot, the slot of said device being perpendicular to the line of motion of said strip of material so as to expose merely an elemental section of said material to the wire of resistance.

21. Apparatus for recording signaling variations in rectangular coordinates comprising a movable strip of material of uniform width, a wire of resistance movable angularly through an arc the chord of which is perpendicular to the line of motion of the strip of material, a bar V-shaped in cross-section the edges of which are perpendicular to the line of motion of said strip of material, said bar deflecting said strip of material as it passes thereover, said bar being mounted close to the wire of resistance and separated therefrom by a predetermined distance.

22. Apparatus for recording signaling variations in rectangular coordinates comprising a movable strip of material upon which a record may be made, a wire of resistance movable angularly through an arc the chord of which is perpendicular to the line of motion of the strip of material, a V-shaped member deflecting the strip of material as it passes thereover, said V-shaped member being always spaced from the wire of resistance, and a shield located between the strip of material and the wire of resistance so as to expose no more than an elemental section of the strip of material to said wire of resistance, the edges of said V-shaped member and said shield being perpendicular to the line of motion of the strip of material.

In testimony whereof, we have signed our names to this specification this 6th day of September 1927.

RALZEMOND D. PARKER.
FRED H. BEST.